(12) United States Patent
Kumar et al.

(10) Patent No.: US 11,173,893 B2
(45) Date of Patent: Nov. 16, 2021

(54) METHOD AND SYSTEM FOR DETECTING AND COMPENSATING FOR MECHANICAL FAULT IN AUTONOMOUS GROUND VEHICLE

(71) Applicant: Wipro Limited, Bangalore (IN)

(72) Inventors: R. Balaji Sunil Kumar, Bengaluru (IN); Manas Sarkar, Barasat (IN)

(73) Assignee: Wipro Limited, Bangalore (IN)

( * ) Notice: Subject to any disclaimer, the term of this patent is extended or adjusted under 35 U.S.C. 154(b) by 141 days.

(21) Appl. No.: 16/729,656

(22) Filed: Dec. 30, 2019

(65) Prior Publication Data
US 2021/0146913 A1 May 20, 2021

(30) Foreign Application Priority Data
Nov. 14, 2019 (IN) .............................. 201941046236

(51) Int. Cl.
*B60W 20/50* (2016.01)
*G05D 1/02* (2020.01)
(Continued)

(52) U.S. Cl.
CPC .......... *B60W 20/50* (2013.01); *B60W 40/107* (2013.01); *B60W 40/109* (2013.01);
(Continued)

(58) Field of Classification Search
CPC .. B60W 20/50; B60W 40/107; B60W 40/109; B60W 40/12; B60W 40/103; G05D 1/0221; G05D 1/0223
See application file for complete search history.

(56) References Cited

U.S. PATENT DOCUMENTS 9,834,224 B2 * 12/2017 Gordon ............... B60W 30/182
10,338,594 B2 * 7/2019 Long ................... G06K 9/00798
(Continued)

FOREIGN PATENT DOCUMENTS

WO WO-2019060234 A1 * 3/2019 ........... G07C 5/0808

OTHER PUBLICATIONS

Jung, D., et al., "Active Fault Management in Autonomous Systems Using Sensitivity Analysis", IFAC PapersOnLine 51-24 (2018) pp. 1099-1104.
(Continued)

*Primary Examiner* — Jeff A Burke
*Assistant Examiner* — Mohamad O El Sayah
(74) *Attorney, Agent, or Firm* — Finnegan, Henderson, Farabow, Garrett & Dunner, LLP

(57) ABSTRACT

This disclosure relates to method and system for detecting and compensating for mechanical fault in autonomous ground vehicle (AGV). For each of a set of trajectory plan segments along a base path during real-time navigation of the AGV, the method may include receiving a plurality of vehicle displacement parameters along a given trajectory plan segment. and determining an optimal velocity twist of the AGV in the given trajectory plan segment using an artificial intelligence (AI) model, based on the plurality of vehicle displacement parameters and a weight of the AGV. The method may further include determining the mechanical fault in the AGV based on a comparison of an actual velocity twist of the AGV in the given trajectory plan segment and the optimal velocity twist of the AGV in the given trajectory plan segment for each of the set of trajectory plan segments.

20 Claims, 9 Drawing Sheets

(51) Int. Cl.
*B60W 40/12* (2012.01)
*B60W 40/109* (2012.01)
*B60W 40/107* (2012.01)
*B60W 40/103* (2012.01)

(52) U.S. Cl.
CPC .......... *B60W 40/12* (2013.01); *G05D 1/0221* (2013.01); *G05D 1/0223* (2013.01); *B60W 40/103* (2013.01)

(56) References Cited

U.S. PATENT DOCUMENTS

| | | | | |
|---|---|---|---|---|
| 2002/0156579 A1* | 10/2002 | Morgan | ................ | G01C 22/02 701/505 |
| 2009/0093960 A1* | 4/2009 | Puhalla | .............. | B60W 40/076 701/301 |
| 2017/0113689 A1* | 4/2017 | Gordon | ................ | B60W 40/04 |
| 2017/0341660 A1* | 11/2017 | Jang | .................... | B60W 30/143 |
| 2018/0164813 A1* | 6/2018 | Poeppel | ............... | G06Q 10/047 |
| 2018/0165895 A1* | 6/2018 | Poeppel | ............... | G07C 5/0808 |
| 2018/0348767 A1* | 12/2018 | Jafari Tafti | ............ | G08G 1/163 |
| 2019/0033862 A1* | 1/2019 | Groden | ................ | G05D 1/0072 |
| 2019/0354116 A1* | 11/2019 | Shomin | .................... | A63K 1/00 |
| 2020/0025570 A1* | 1/2020 | Li | .............................. | G06T 7/73 |
| 2020/0033870 A1* | 1/2020 | Derenick | ............. | G05D 1/0221 |
| 2020/0062126 A1* | 2/2020 | Duan | ...................... | B60L 15/00 |
| 2020/0319638 A1* | 10/2020 | Bowen | ................. | B60W 50/14 |
| 2020/0377113 A1* | 12/2020 | Whikehart | .......... | G07C 5/0816 |
| 2020/0401161 A1* | 12/2020 | Yong | .................... | G05D 1/0295 |
| 2021/0046926 A1* | 2/2021 | Olson | ................... | G05D 1/0088 |
| 2021/0114617 A1* | 4/2021 | Phillips | .............. | G01C 21/3453 |

OTHER PUBLICATIONS

Realpe, M., et al., "Sensor Fault Detection and Diagnosis for autonomous vehicles", MATEC Web of Conferences 30, 04003, (2015), 6 pages.

* cited by examiner

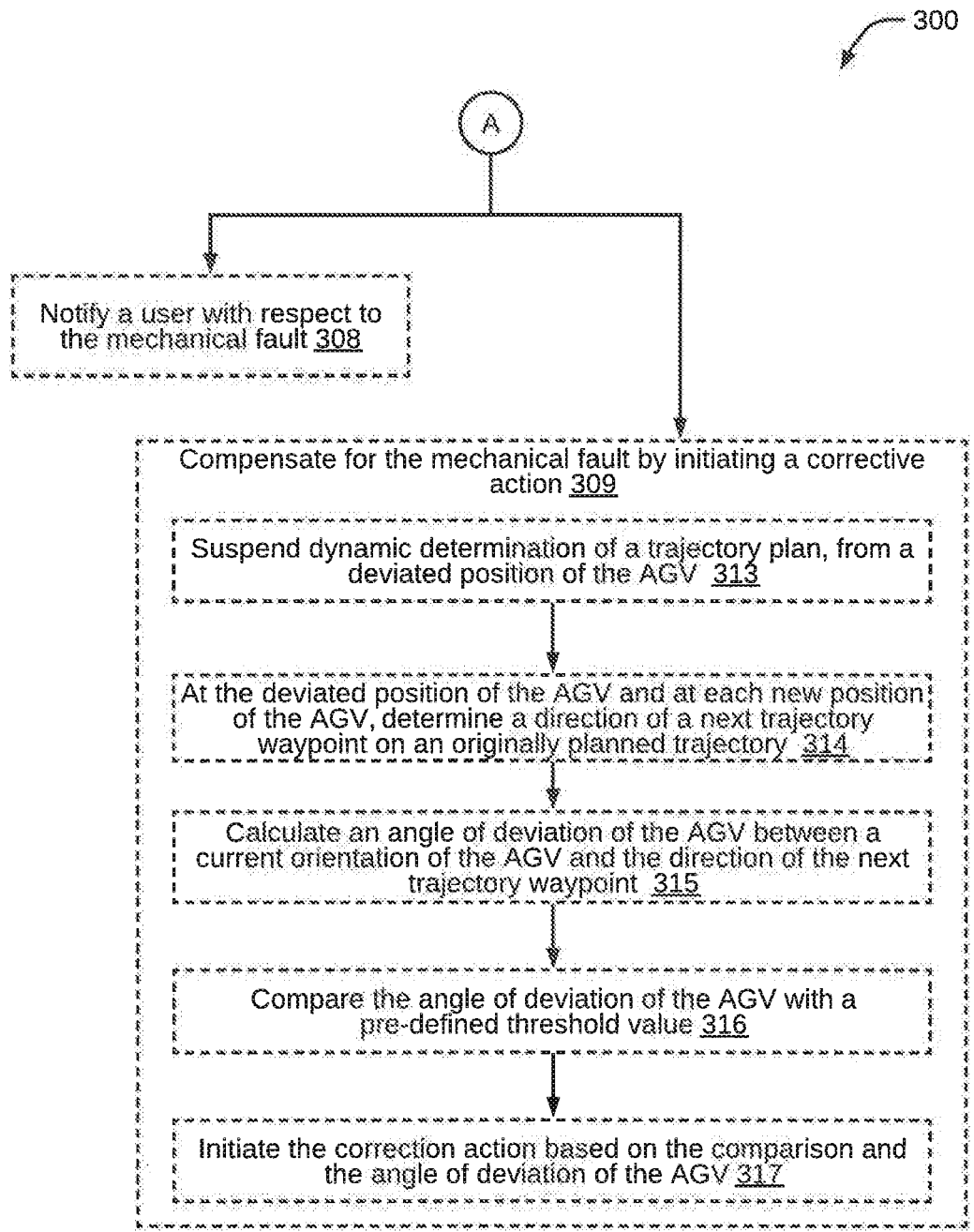
FIG. 3 contd.

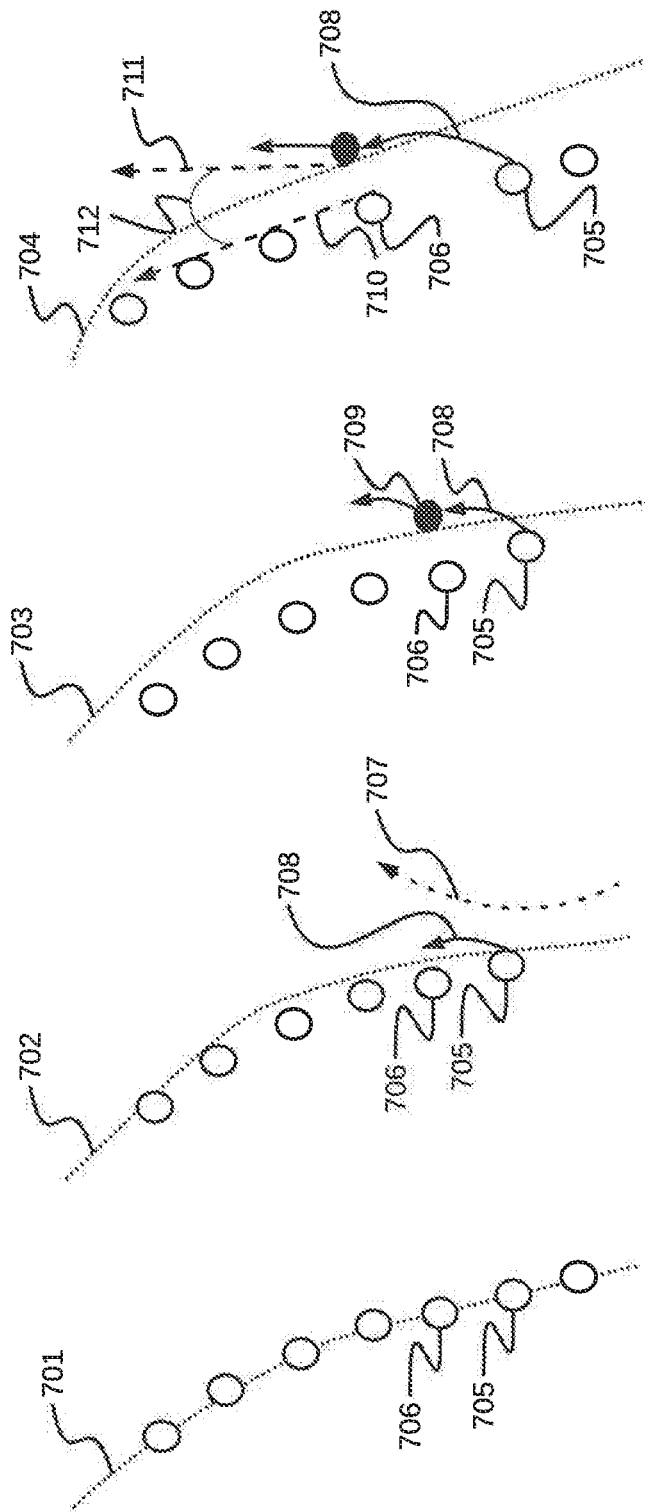

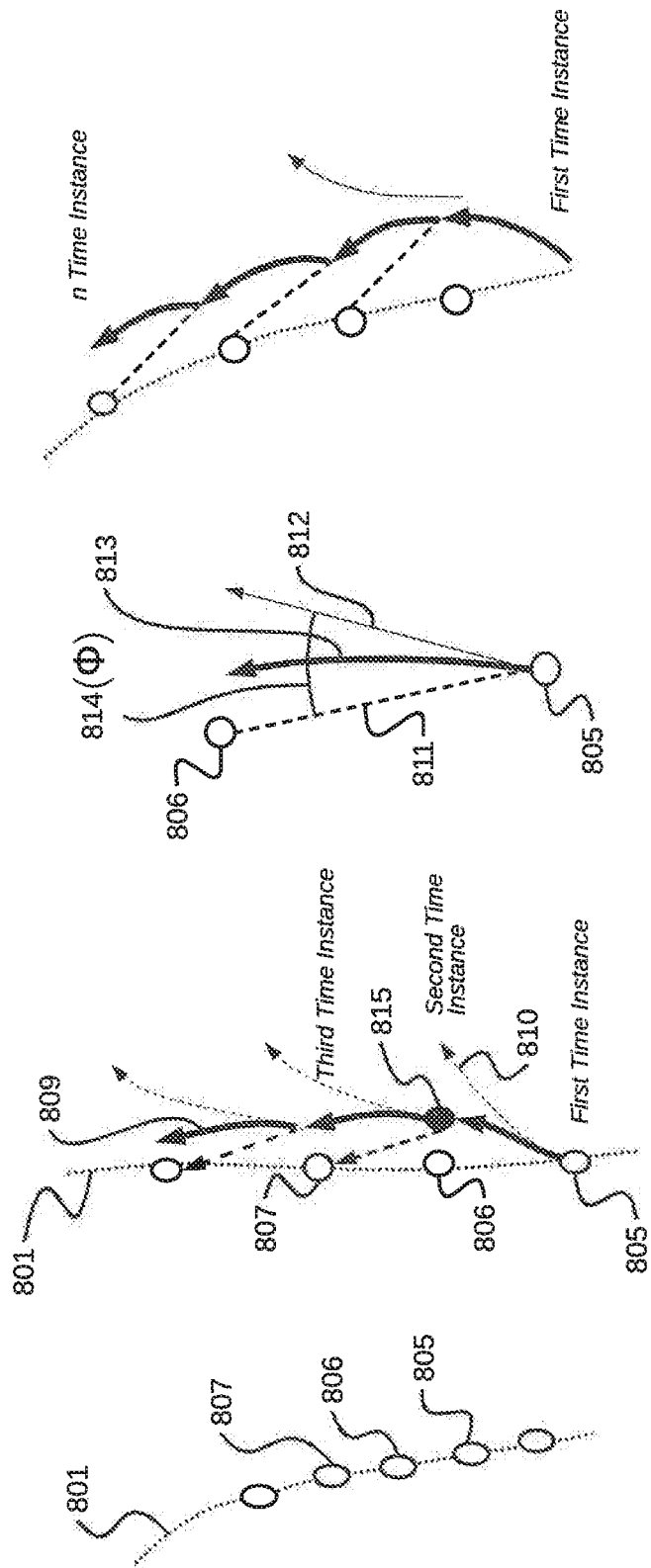

METHOD AND SYSTEM FOR DETECTING AND COMPENSATING FOR MECHANICAL FAULT IN AUTONOMOUS GROUND VEHICLE

TECHNICAL FIELD

This disclosure relates generally to autonomous ground vehicle (AGV), and more particularly to method and system for detecting mechanical faults in an AGV.

BACKGROUND

Autonomous Ground Vehicles (AGVs) are capable of navigation due to path planning at two levels—global and local. The global path is determined between the current location of the AGV and its destination input by the user. The local path planning may include observing and analyzing immediate environment and displacement parameters, such as linear and angular velocity of the AGV using various sensors present in the AGV. Since the sensors provide data at a faster rate, changes and adjustments made to local paths are more frequent than those in the global path. In fact, the global path changes may occur only if the user changes the destination or a shorter route is determined by the AGV during its journey. Local path planning involves finer adjustments to the velocity and position of the AGV, so as to maintain its trajectory.

As will be appreciated, in cases of certain mechanical damages to the AGV, such as a fault in the drive shaft or wheel joints, which may cause a leftward or rightward movement affinity in the AGV, the control unit of the AGV may apply an extra torque to keep the AGV on its trajectory. The extra torque consumes higher power and makes the AGV fuel inefficient. Besides, the damage may worsen, if not detected timely. Such faults lead to erroneous local path planning in the AGV.

SUMMARY

In one embodiment, a method of detecting a mechanical fault in an autonomous ground vehicle (AGV) is disclosed. In one example, the method may include, for each of a set of trajectory plan segments along a base path during real-time navigation of the AGV, receiving a plurality of vehicle displacement parameters along a given trajectory plan segment, and determining an optimal velocity twist of the AGV in the given trajectory plan segment using an artificial intelligence (AI) model, based on the plurality of vehicle displacement parameters and a weight of the AGV. The plurality of vehicle displacement parameters may include an approaching velocity twist of the AGV for the given trajectory plan segment, a departing velocity twist of the AGV for the given trajectory plan segment, an approaching orientation of the AGV in the given trajectory plan segment and an orientation shift in the given trajectory plan segment. The method may further include determining the mechanical fault in the AGV based on a comparison of an actual velocity twist of the AGV in the given trajectory plan segment and the optimal velocity twist of the AGV in the given trajectory plan segment for each of the set of trajectory plan segments.

In one embodiment, a system for detecting a mechanical fault in an AGV is disclosed. In one example, the system may include a fault detection device, which may include at least one processor and a memory communicatively coupled to the at least one processor. The memory may store processor-executable instructions, which, on execution, may cause the processor to, for each of a set of trajectory plan segments along a base path during real-time navigation of the AGV, receive a plurality of vehicle displacement parameters along a given trajectory plan segment, and determine an optimal velocity twist of the AGV in the given trajectory plan segment using an artificial intelligence (AI) model, based on the plurality of vehicle displacement parameters and a weight of the AGV. The processor-executable instructions, on execution, may further cause the processor to determine the mechanical fault in the AGV based on a comparison of an actual velocity twist of the AGV in the given trajectory plan segment and the optimal velocity twist of the AGV in the given trajectory plan segment for each of the set of trajectory plan segments.

In one embodiment, a non-transitory computer-readable medium storing computer-executable instructions for detecting a mechanical fault in an AGV is disclosed. In one example, the stored instructions, when executed by a processor, may cause the processor to perform operations including, for each of a set of trajectory plan segments along a base path during real-time navigation of the AGV, receiving a plurality of vehicle displacement parameters along a given trajectory plan segment, and determining an optimal velocity twist of the AGV in the given trajectory plan segment using an artificial intelligence (AI) model, based on the plurality of vehicle displacement parameters and a weight of the AGV. The operations may further include determining the mechanical fault in the AGV based on a comparison of an actual velocity twist of the AGV in the given trajectory plan segment and the optimal velocity twist of the AGV in the given trajectory plan segment for each of the set of trajectory plan segments.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 7A-D illustrate an exemplary process for detecting a mechanical fault in an AGV, in accordance with some embodiments of the present disclosure; and FIGS. 8A-D illustrates an exemplary process for compensating for the mechanical fault by initiating a corrective action, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
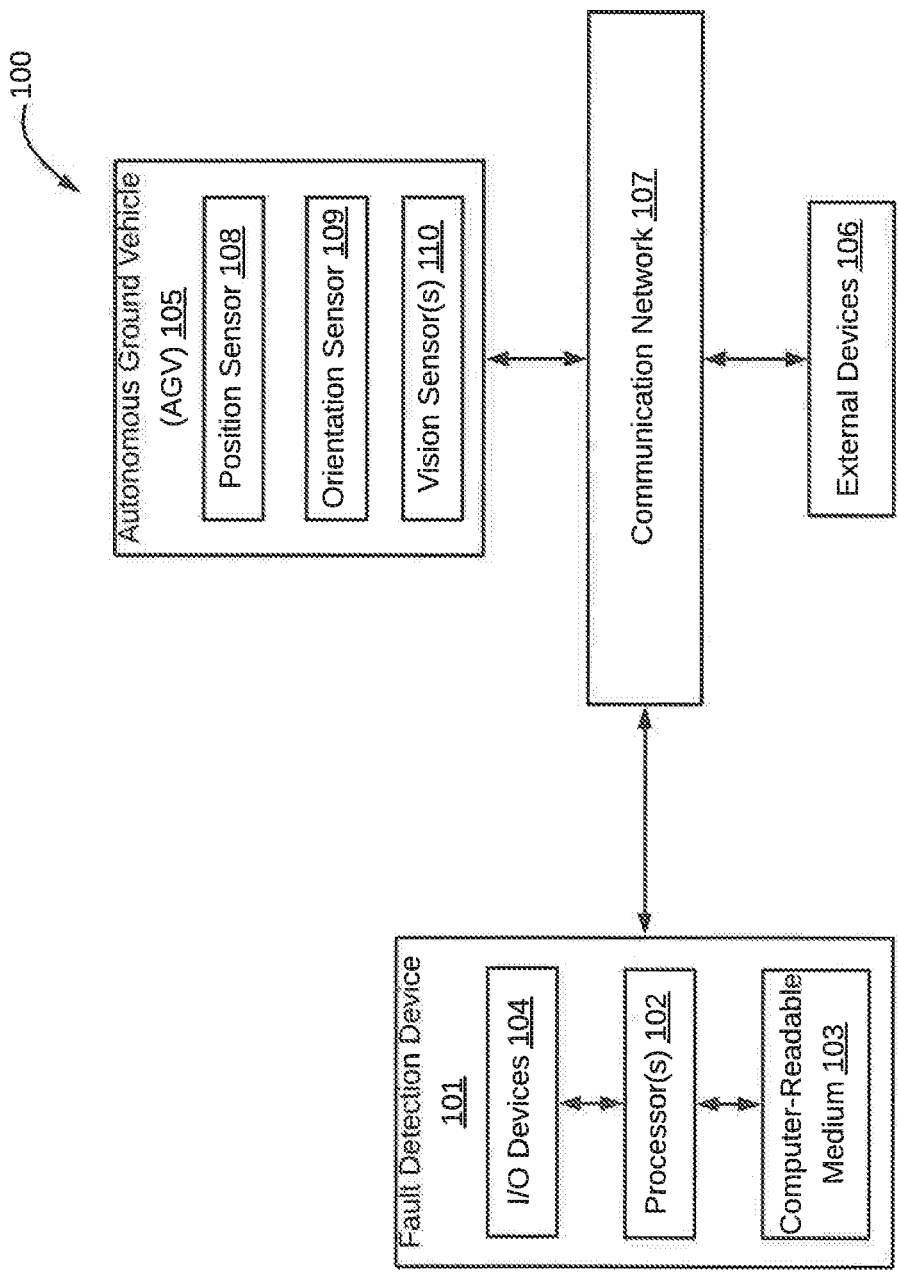
FIG. 1 is a block diagram of an exemplary system for detecting a mechanical fault in an autonomous ground vehicle (AGV), in accordance with some embodiments of the present disclosure.

Referring now to FIG. 1, an exemplary system 100 for detecting a mechanical fault in an autonomous ground vehicle (AGV) 105, is illustrated, in accordance with some embodiments of the present disclosure. In particular, the system 100 may implement a fault detection device 101 so as to detect a mechanical fault in the AGV 105. As will be appreciated, the fault detection device 101 may be any computing device (for example, server, desktop, laptop, notebook, netbook, tablet, smartphone, mobile phone, or the like).

Further, as will be appreciated by those skilled in the art, the AGV 105 may be any vehicle capable of sensing the dynamic changing environment, and of navigating without any human intervention. Thus, the AGV 105 may include one or more sensors, a vehicle drivetrain, and a processor-based control system, among other components. The one or more sensors may sense dynamically changing environment by capturing various sensor parameters. The sensors may include a position sensor 108, an orientation sensor 109, and one or more vision sensors 110. In some embodiments, the position sensor 108 may acquire an instant position (i.e., current location) of the AGV 105 with respect to a navigation map (i.e., within a global reference frame). The orientation sensor 109 may acquire an instant orientation (i.e., current orientation) of the AGV 105 with respect to the navigation map. The one or more vision sensors 110 may acquire an instant three-dimensional (3D) image of an environment around the AGV 105. In some embodiments, the 3D image may be a 360 degree field of view (FOV) of the environment (i.e. environmental FOV) that may provide information about presence of any objects in the vicinity of the AGV 105. Further, in some embodiments, the 3D image may be a frontal FOV of a navigation path (i.e., navigational FOV) of the AGV 105. By way of an example, the position sensor 108 may be a global positioning system (GPS) sensor, the orientation sensor 109 may be an inertial measurement unit (IMU) sensor, and the vision sensor 110 may selected from a Light Detection And Ranging (LiDAR) scanner, a LASER scanner, a Radio Detection And Ranging (RADAR) scanner, a short-range RADAR scanner, a camera, or an ultrasonic scanner.

As will be described in greater detail in conjunction with FIGS. 2-8, the fault detection device 101 may, for each of a set of trajectory plan segments along a base path, during real-time navigation of the AGV, receive a plurality of vehicle displacement parameters along a given trajectory plan segment, and determine an optimal velocity twist of the AGV in the given trajectory plan segment using an artificial intelligence (AI) model, based on the plurality of vehicle displacement parameters and a weight of the AGV. The plurality of vehicle displacement parameters may include an approaching velocity twist of the AGV for the given trajectory plan segment, a departing velocity twist of the AGV for the given trajectory plan segment, an approaching orientation of the AGV in the given trajectory plan segment, and an orientation shift in the given trajectory plan segment. The fault detection device 101 may further determine the mechanical fault in the AGV based on a comparison of an actual velocity twist of the AGV in the given trajectory plan segment and the optimal velocity twist of the AGV in the given trajectory plan segment for each of the set of trajectory plan segments.

In some embodiments, the fault detection device 101 may receive an initial location of the AGV 105 from the position sensor 108 and a destination location from a user. In such embodiments, the fault detection device 101 may determine a base path between the initial location of the AGV 105 and the destination location. Further, in such embodiments, the fault detection device 101 may divide the base path into the set of trajectory plan segments and determine a trajectory plan for each of the set of trajectory plan segments using the orientation sensor 109 and the vision sensor 110. It should be noted that each of the set of trajectory plan segments may include an initial trajectory waypoint and a final trajectory waypoint. The initial trajectory waypoint and the final trajectory waypoint may be, for example, GPS locations or latitude and longitude coordinates present on the base path.

The fault detection device 101 may include one or more processors 102, a computer-readable medium (for example, a memory) 103, and an input/output (I/O) device 104. The computer-readable medium 103 may store instructions that, when executed by the one or more processors 102, cause the one or more processors 102 to detect a mechanical fault in the AGV 105, in accordance with aspects of the present disclosure. The computer-readable medium 103 may also store various data (for example, pre-identified properties of multiple fixed objects at multiple positions on a navigation path, vision sensor data at each position, distance and angle of observation of each fixed object at each position, coordinate positions of each fixed object at each position, calculated orientation of AGV at each position, reading of the orientation sensor at each position, variation ranges of the orientation sensor along with corresponding average performance deviations, or the like) that may be captured, processed, and/or required by the fault detection device 101. The fault detection device 101 may interact with the user via a user interface accessible via the I/O devices 104. The fault detection device 101 may also interact with one or more external devices 106 or with the AGV 105 over a communication network 107 for sending or receiving various data. The external devices 106 may include, but may not be limited to, a remote server, a digital device, or another computing system.

During operation, an AI model for velocity twist generation may be trained for a given scenario and preconditions. It may be noted that the scenario may be a trajectory curve that has been generated considering various environment conditions. It may be further noted that the pre-conditions may include a AGV velocity projection from its current velocity over time, and weight load condition of the AGV. During the training of the AI model, the AGV may be maneuvered following different trajectory, speed, and load conditions. As a result, the AI model may learn to determine an ideal velocity for different scenarios. Later, when the AGV performs actual navigation, the AGV generated velocity may be compared with the AI generated velocity for the same scenarios over a period of time. A deviation may indicate presence of a mechanical fault.

Figure 2:
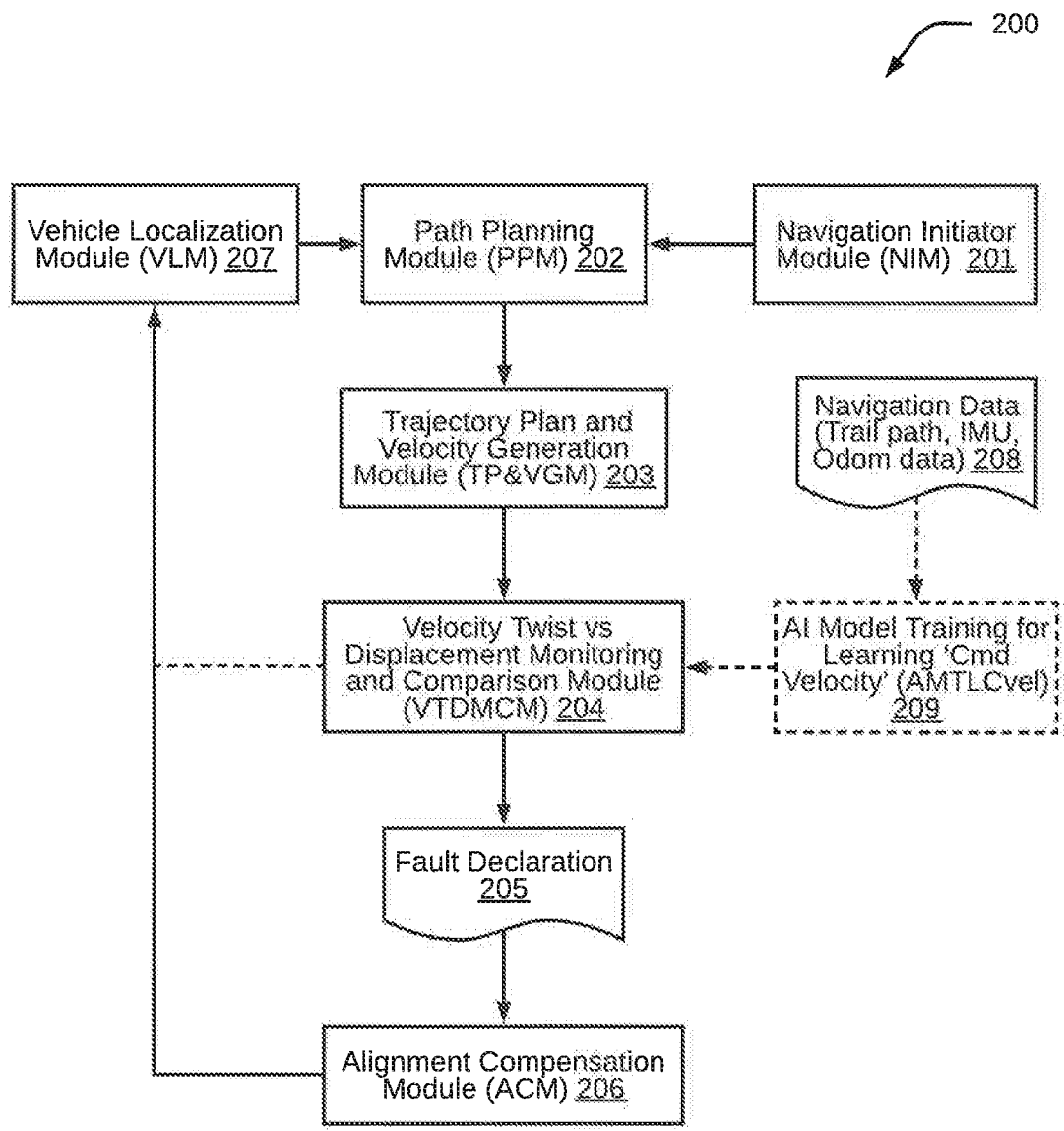
FIG. 2 is a functional block diagram of the exemplary system of FIG. 1, in accordance with some embodiments of the present disclosure.

Referring now to FIG. 2, a functional block diagram of, an exemplary system 200, analogous to the exemplary system 100, is illustrated, in accordance with some embodiments of the present disclosure. The system 200 may include various modules that perform various functions so as to detect a mechanical fault in the AGV 105, and to compensate for the mechanical fault by initiating a corrective action in the AGV 105. In some embodiments, the system 200 may include a Navigation Initiation Module (NIM) 201, a Path Planning Module (PPM) 202, a Trajectory Plan And Velocity Generation Module (TP&VGM) 203, a Velocity Twist Vs Displacement Monitoring And Comparison Module (VTDMCM) 204, an Alignment Comparison Module (ACM) 206, a Vehicle Localization Module (VLM) 207, and an AI Model Training for Learning Command Velocity (AMTLCvel) 209. It should be noted that, in some embodiments, the VTDMCM 204, the ACM 206, and the AMTLCvel 209 may be a part of the fault detection device in the system 200, while the NIM 201, PPM 202, TP&VGM 203, and VLM 207 may be a part of a navigation device in the AGV in the system 200. As will be appreciated, the system 200 may also include various other modules than those mentioned above so as to control and navigate the AGV. Further, as will be appreciated by those skilled in the art, all such aforementioned modules 201-204, 206-207, and 209 may be represented as a single module or a combination of different modules. Moreover, as will be appreciated by those skilled in the art, each of the modules 201-204, 206-207, and 209 may reside, in whole or in parts, on one device or multiple devices in communication with each other.

The NIM 201 may be configured to initiate a navigation process. By way of an example, the navigation process may include path planning, velocity generation to autonomously drive the AGV from a source to a destination, and so on. In some embodiments, the NIM 201 may be a user interface (UI) layer to the system 200. As such, the MM 201 may display a navigation map to a user. Further, the navigation map may show a current initial location (e.g. source location) of the AGV to the user. In some embodiments, this UI layer may be provided through a touch screen. By way of an example, the user may input a destination location on the displayed navigation map by touching a corresponding map location of the destination location. The PPM 202 may generate a base path for the AGV's navigation from the current position to the destination point. By way of an example, the PPM 202 may generate the base path using any path planning algorithm like Dijkstra, or A*, or any other path planning algorithm. The PPM 202 may generate the base path on a 2D occupancy grid map. This may be called path planning.

The TP&VGM 203 may generate a trajectory plan for the AGV. It may be understood that the AGV may need a part of global path for a short distance ahead, for example, 10-15 meters, starting from any global path point. This part of the global path may be called a trajectory path. The trajectory plan may be generated for this much distance (i.e. the trajectory path), based on the current environment data and AGV speed. The trajectory plan may be a velocity-position plan for the AGV for next few meters distance from a current position of the AGV. Based on the trajectory plan, the AGV may further generate a velocity twist so as to adhere to the trajectory plan.

The VTDMCM 204 may compare the AGV velocity twist ($V_t$) with ideal scenarios. In other words, the VTDMCM 204 may compare the AGV velocity twist with respect to the optimal AGV velocity ($V_{to}$) twist generated from learned AI model. In some embodiments, the optimal velocity twist of the AGV may be determined by the AMTLCvel 209.

The VTDMCM 204 may further monitor the AGV for any additional acceleration or twist effort that may be beyond normalcy. The VTDMCM 204 may further generate an alert (as a mechanical fault) upon detecting an abnormal reading. In an exemplary scenario, when the difference between the values of the $V_t$ of the AGV and $V_{to}$ of the AGV is above a predefined threshold value, the VTDMCM 204 may further determine the scenario as a mechanical fault in the AGV and give a fault declaration 205. The VTDMCM 204 may further cause to notify the user with respect to the mechanical fault, or, in some embodiments, to compensate for the mechanical fault by initiating a corrective action.

The ACM 206 may be configured to apply a compensatory angular velocity to keep the AGV aligned to the original trajectory plan. It may be noted that, in some scenarios, the AI model (or an AI velocity monitor) may indicate an additional shifting effort. It may be understood that in such a scenario, an extra torque is being applied for compensating an angular shift. Further, if no external reason for the vehicle to be deviating from the planned trajectory is found (for example, by a perception module), the ACM 206 may start applying compensatory angular velocity to keep the AGV aligned to the original trajectory plan. In other words, the ACM 206 may compensate for the mechanical fault by initiating a corrective action. In some embodiments, the TP&VGM 203 may dynamically determine a new trajectory plan based on the current location and the current orientation of the AGV.

In an exemplary scenario, when the VTD and the $VTD_o$ are different, the AGV may move leftward or rightward from an originally planned trajectory. In such a scenario, the corrective action may include a temporary suspension of the dynamic determination of the trajectory plan by the TP&VGM 203 from a deviated position of the AGV, determining a direction of a next trajectory waypoint on an originally planned trajectory, calculating an angle of deviation of the AGV between the current orientation of the AGV and the direction of the next trajectory waypoint, comparing the angle of deviation of the AGV with a pre-defined threshold value, and initiating the corrective action based on the comparison and the angle of deviation of the AGV.

The VLM 207 may be configured to receive the AGV's current position on the map. The VLM 207 may use a camera-based location identification by observing some unique landmark and fetching its previous observation data record from known position. In some embodiments, the VLM 207 may compare the current observation with the previous observation data of known locations.

The AMTLCvet 209 may include an AI model for determining the optimal velocity twist of the AGV. The AI model may determine the optimal velocity twist using AGV displacement parameters and weight of the AGV, as a set of inputs for each of the set of trajectory plan segments. The AI model may be based on an artificial neural network (ANN), or any other machine learning or AI algorithm. The set of inputs for each of the set of trajectory plan segments may be received from navigation data 208. By way of an example, the navigation data 208 may include trail path, IMU data, and Odom data. As it will appreciated, by those skilled in the art, Odom data or odometry data may be data received from motion sensors for estimating a change in position over time. The AI model may be trained to learn for a required displacement of moving the AGV in a time slice of (velocity) controlling frequency, e.g. 200 milliseconds, and the velocity twist that is being applied to the AGV on a particular load condition.

It should be noted that all such aforementioned modules 201-204, 206-207, and 209 may be implemented in programmable hardware devices such as programmable gate arrays, programmable array logic, programmable logic devices, or the like. Alternatively, all such aforementioned modules 201-204, 206-207, and 209 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by one skilled in the art, a variety of processes may be employed for detecting the mechanical fault in an AGV. For example, the exemplary system 100 and the associated fault detection device 101 may detect the mechanical fault in the AGV 105 by the processes discussed herein. In particular, as will be appreciated by those of ordinary skill in the art, control logic and/or automated routines for performing the techniques and steps described herein may be implemented by the system 100 and the associated fault detection device 101, either by hardware, software, or combinations of hardware and software. For example, suitable code may be accessed and executed by the one or more processors on the system 100 or the associated fault detection device 101 to perform some or all of the techniques described herein. Similarly, application specific integrated circuits (ASICs) configured to perform some or all of the processes described herein may be included in the one or more processors on the system 100 or on the associated fault detection device 101.

Figure 3:
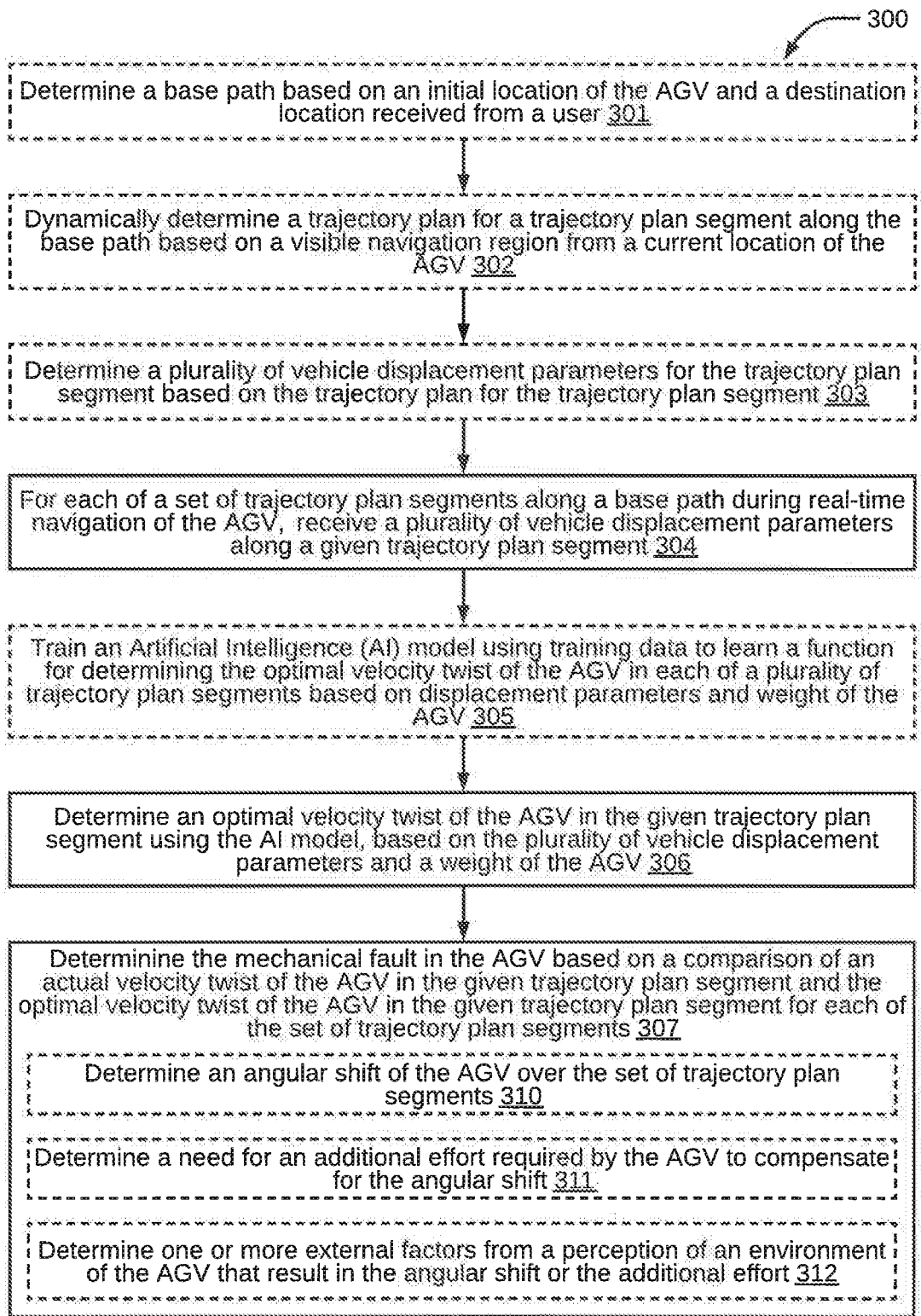
FIG. 3 is a flow diagram of an exemplary control logic for detecting a mechanical fault in an AGV, in accordance with some embodiments of the present disclosure.

For example, referring now to FIG. 3, an exemplary control logic 300 for detecting the mechanical fault in the AGV via a system, such as the system 100 or the associated fault detection device 101, is depicted via a flowchart, in accordance with some embodiments of the present disclosure. As illustrated in the flowchart, the control logic 300 may include, for each of a set of trajectory plan segments along a base path during real-time navigation of the AGV, receiving a plurality of vehicle displacement parameters along a given trajectory plan segment at step 304. The control logic 300 may further include determining an optimal velocity twist of the AGV in the given trajectory plan segment using an artificial intelligence (AI) model, based on the plurality of vehicle displacement parameters and a weight of the AGV, at step 306. The control logic 300 may further include determining the mechanical fault in the AGV based on a comparison of an actual velocity twist of the AGV in the given trajectory plan segment and the optimal velocity twist of the AGV in the given trajectory plan segment for each of the set of trajectory plan segments, at step 307. The control circuit 300 is further explained in detail below.

In some embodiments, the control circuit 300 may include a step of determining a base path based on an initial location of the AGV and a destination location received from a user, at step 301. The control circuit 300 may further include step of dynamically determining a trajectory plan for a trajectory plan segment along the base path, based on a visible navigation region from a current location of the AGV, at step 302. The trajectory plan may include a velocity-position plan for the AGV. The control circuit 300 may further include the step of determining a plurality of vehicle displacement parameters for the trajectory plan segment based on the trajectory plan for the trajectory plan segment, at step 303.

At step 304, a plurality of vehicle displacement parameters along a given trajectory plan segment may be received, for each of a set of trajectory plan segments along a base path during real-time navigation of the AGV. It may be noted that the plurality of vehicle displacement parameters may include an approaching velocity twist of the AGV for the given trajectory plan segment, a departing velocity twist of the AGV for the given trajectory plan segment, an approaching orientation of the AGV in the given trajectory plan segment, and an orientation shift in the given trajectory plan segment. It may be further noted that the velocity twist of the AGV may include an angular velocity of the AGV and a linear velocity of the AGV.

In some embodiments, the control logic 300 may further include the step of training the an model using training data to learn a function for determining the optimal velocity twist of the AGV in each of a plurality of trajectory plan segments based on the displacement parameters and weight of the AGV, at step 305. It should be noted that, in some embodiments, the training data may be generated by manually driving the AGV along a predefined path at a predefined speed.

At step 306, an optimal velocity twist of the AGV in the given trajectory plan segment may be determined using an artificial intelligence (AI) model, based on the plurality of vehicle displacement parameters and a weight of the AGV, for each of a set of trajectory plan segments along a base path during real-time navigation of the AGV. It may be noted that the AI model may include an artificial neural network (ANN) based model.

At step 307, the mechanical fault in the AGV may be determined based on a comparison of an actual velocity twist of the AGV in the given trajectory plan segment and the optimal velocity twist of the AGV in the given trajectory plan segment for each of the set of trajectory plan segments. In some embodiments, determining the mechanical fault in the AGV may further include the step of determining an angular shift of the AGV over the set of trajectory plan segments, at step 310. Alternately, in some other embodiments, determining the mechanical fault in the AGV may include the step of determining a need for an additional effort required by the AGV to compensate for the angular shift, at step 311. Alternately, in some embodiments, determining the mechanical fault in the AGV may include the step of determining, one or more external factors from a perception of an environment of the AGV that result in the angular shift or the additional effort, at step 312.

In some embodiments, the control logic 300 may further include the step of notifying a user with respect to the mechanical fault, at step 308. In alternate embodiments, instead of step 308, the control logic 300 may include the step 309 of compensating for the mechanical fault by initiating a corrective action. In some embodiments, performing the step 309 may further include performing the steps 313-317. For example, at step 313, from a deviated position of the AGV, the dynamic determination of a trajectory plan may be suspended. At step 314, at the deviated position of the AGV and at each new position of the AGV, a direction of a next trajectory waypoint on an originally planned trajectory may be determined. At step 315, an angle of deviation of the AGV between a current orientation of the AGV and the direction of the next trajectory waypoint may be calculated. At step 316, the angle of deviation of the AGV may be compared with a pre-defined threshold value. At step 317, the corrective action may be initiated based on the comparison and the angle of deviation of the AGV.

Figure 4:
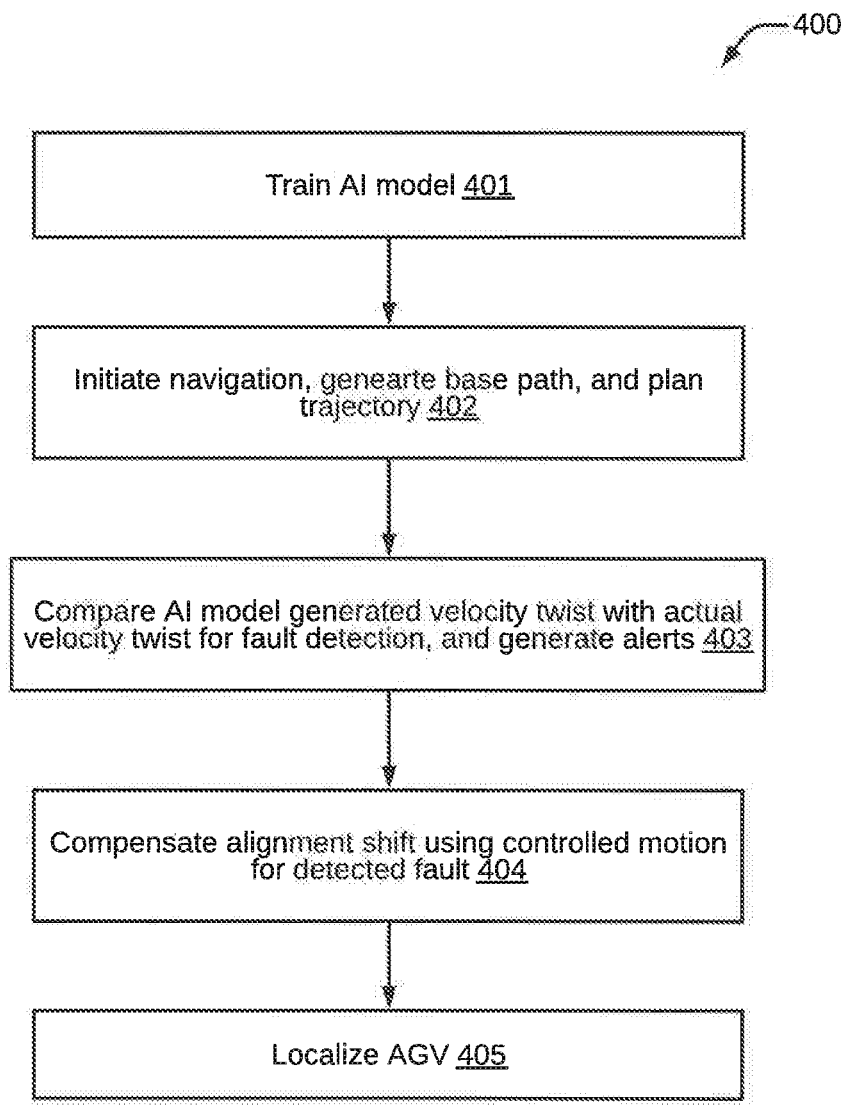
FIG. 4 is a flow diagram of a detailed exemplary process for detecting a mechanical fault in an AGV, in accordance with some embodiments of the present disclosure.

Referring now to FIG. 4, an exemplary process 400 for detecting the mechanical fault in the AGV is depicted in greater detail via a flowchart, in accordance with some embodiments of the present disclosure. At step 401, an AI model may be trained. At step 402, navigation of the AGV may be initiated, and a base path and a trajectory plan may be generated. At step 403, the learned velocity twist may be compared with actual twist, for fault detection, and alerts may be generated. At step 404, an alignment shift may be compensated using controlled motion, for the detected fault. At step 405, the AGV may be localized. Each of these steps 401-405 will be described in greater detail below.

At step 401, the AI model of the AMTLCvel 209 may be trained to learn a function for an optimal velocity twist for each of a set of trajectory plan segments, under a particular weight load condition (of the AGV). In some embodiments, a kernel function may be used for generating a trained AI model to determine the optimal velocity twist. In such embodiments, the kernel function may be, for example, a sigmoid function. As it will be appreciated, the AI model may include a set of interconnected nodes. The set of interconnected nodes may form a neural network. It may be noted that each of the set of interconnected nodes may include a kernel function. The kernel functions of each of the set of interconnected nodes may be different. In order to train the AI model, the AGV may be driven by an operator along a known trajectory at a predefined speed. This AI model may be fed with input data of this maneuvering. The training of the AI model is further explained in conjunction with FIGS. 5A-D Referring now to FIGS. 5A-5D, an exemplary process of training the AI model is illustrated, in accordance with an embodiment. FIGS. 5A-5D show fixed displacement trajectories 502-505, respectively, for an AGV 501. The trajectories 502-505 are generated in advance which are followed by the operator of the AGV 501. During training of the AI model, the AGV 501 may be driven by an operator along the trajectories 502-505 at a predefined speed. It may be understood that while following a trajectory, an orientation of the AGV 501 may change along the trajectory. The AGV 501 may move along a defined trajectory plan divided into a set of trajectory plan segments.

Figure 5D:
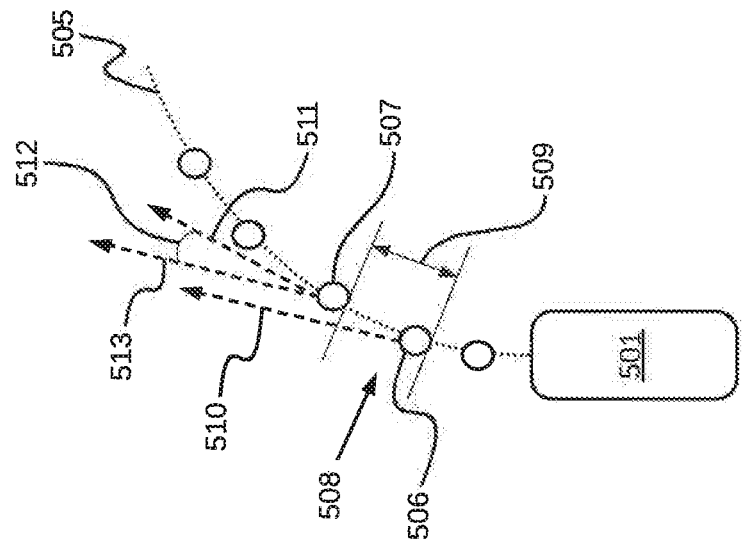
FIGS. 5A-D illustrate an exemplary process of training an Artificial Intelligence (AI) model, in accordance with some embodiments of the present disclosure.
Figure 5C:
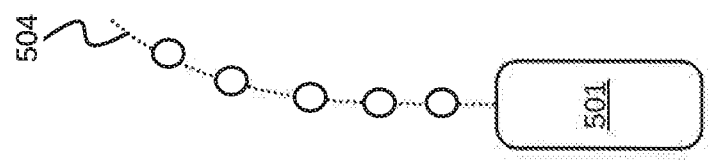
Figure 5B:
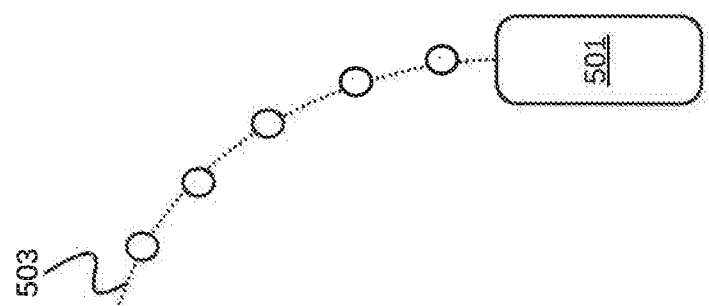
Figure 5A:
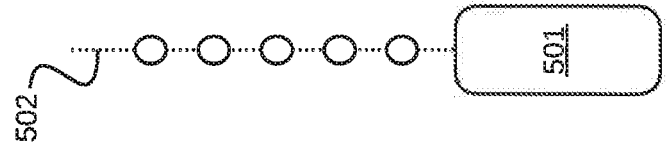

Referring to FIG. 5D, a trajectory plan segment 508 of the trajectory 505 may include an initial trajectory waypoint 506, a final trajectory waypoint 507, and a displacement 509. In some embodiments, the displacement 509 may be same for each of the set of trajectory plan segments of the trajectory 505. The AGV 501 may have a current initial orientation 510 (i.e. at the initial trajectory waypoint 506) and a final orientation 511 (i.e. at the final trajectory waypoint 507). An angle of deviation 512 between the initial orientation 510 and the final orientation 511 may be measured by calculating a difference between an extrapolated orientation 513 of the initial orientation 510 at the initial trajectory waypoint 506 and the final orientation 511, respectively.

Figure 6:
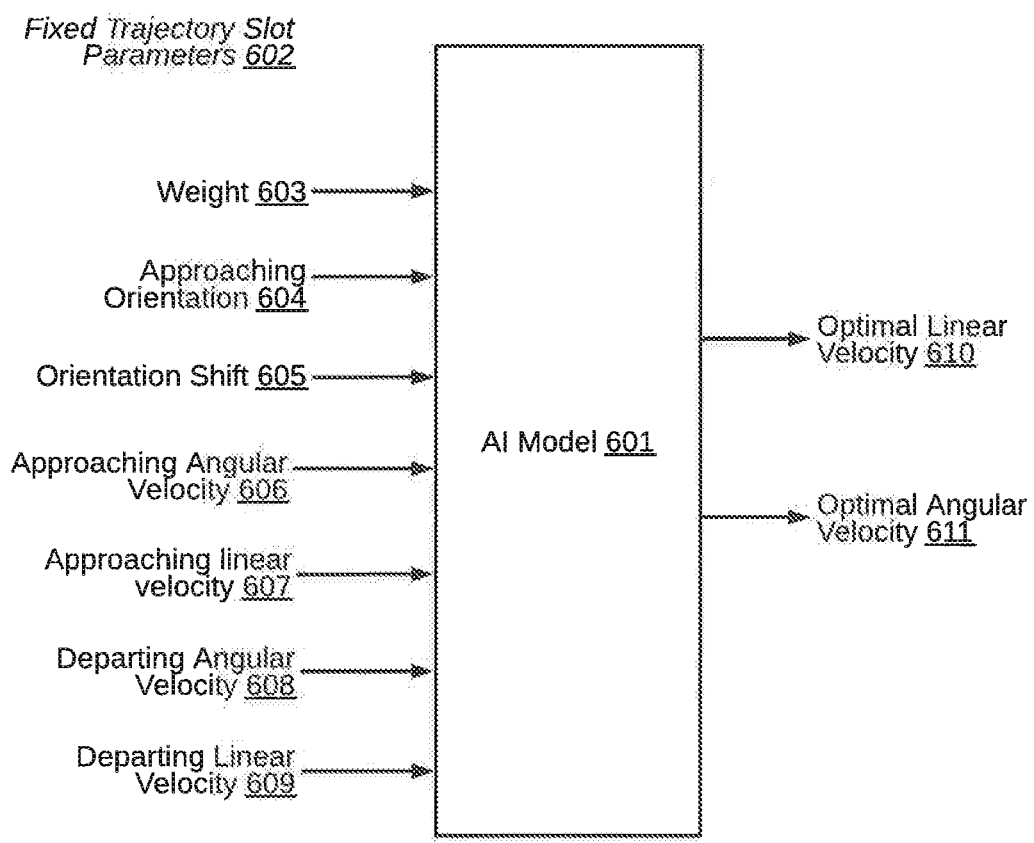
FIG. 6 illustrates a block diagram of an exemplary AI model for determining an optimal velocity twist of the AGV, in accordance with some embodiments of the present disclosure.

Referring now to FIG. 6, a block diagram of an exemplary AI model 601 for determining an optimal velocity twist of the AGV is depicted, in accordance with some embodiments of the present disclosure. The AI model 601 may be trained on a plurality of vehicle displacement parameters (or to say, a set of fixed trajectory slot parameters) 602. As such, the AI model 601 may receive the set of fixed trajectory slot parameters 602 and may determine an optimal linear velocity 610 of the AGV and an optimal angular velocity 611 of the AGV. The set of fixed trajectory slot parameters 602 may include a weight of the AGV 603, an approaching orientation of the AGV (in the given trajectory plan segment) 604, an orientation shift (in the given trajectory plan segment) 605, an approaching velocity twist of the AGV for the given trajectory plan segment, and a departing velocity twist of the AGV for the given trajectory plan segment. The approaching velocity twist of the AGV (for the given trajectory plan segment) may further include an approaching angular velocity 606 and an approaching linear velocity 607. The departing velocity twist of the AGV may further include a departing angular velocity 608 and an departing linear velocity 609. The trained AI model 601, upon training, may determine an optimal velocity twist, based on the vehicle displacement parameters. As it will be appreciated, the optimal velocity twist may include an optimal linear velocity 610 and an optimal angular velocity 611.

It may be noted that the set of fixed trajectory slot parameters 602 may be received for each of the set of trajectory plan segments. It should be noted that the approaching orientation 604 of the AGV may be the orientation of the AGV at the initial trajectory waypoint of a given trajectory plan segment. The orientation shift 605 of the AGV may be the difference between the approaching orientation 604 of the AGV and an orientation of the AGV at the final trajectory waypoint of a given trajectory plan segment. It should also be noted that the approaching angular velocity 606 of the AGV may be the angular velocity of the AGV at the initial trajectory waypoint of a given trajectory plan segment and the departing angular velocity 608 of the AGV may be the angular velocity of the AGV at the final trajectory waypoint of a given trajectory plan segment. It should also be noted that the approaching linear velocity 607 of the AGV may be the linear velocity of the AGV at the initial trajectory waypoint of a given trajectory plan segment and the departing linear velocity 609 of the AGV may be the linear velocity of the AGV at the final trajectory waypoint of a given trajectory plan segment.

Returning back to FIG. 4, at step 401. further, an error/dement component velocity twist between AI model estimated velocity and an actual maneuvering velocity twist may be back propagated along the kernel node. This may allow for fine tuning the learning of the AI model, and allow for better result estimation. It may be understood that this input feed and back propagation may be done multiple number of times (for example, to the tune of one million) until the learning of the AI model is achieved to a desired level of accuracy to determine optimal velocity twist.

At step 402, the NIM 201 may initiate determining of the base path, generating a velocity for the AGV, and autonomously driving the AGV from a current location to a destination location. The PPM 202 may generate the base path from the current location to the destination location, based on a source and a destination point (path planning). It may be understood that for motion, the AGV may need some part of global path, possibly 10-20 meters ahead of starting from global path point. It may be necessary to smoothen this portion of path so as to accommodate the AGV motion at any instant.

At step 403, the VTDMCM 204 may start executing the trajectory plan. A realistic velocity may be generated based on a previous moment velocity and a projected velocity according to the trajectory-velocity plan. In some embodiments, the optimal velocity may be determined after a fixed time interval. The fixed time interval may be, for example, 100 milliseconds. At a next moment, the velocity may be observed for further realistic velocity calculation. In other words, at each time slot, an actual velocity twist (linear+ angular velocity) may be calculated based on the entering velocity and the exiting velocity twist projection, at the beginning and the end, respectively, of the trajectory plan segment. In such embodiments, simultaneously, one or more conditions for the velocity generation relating to the environment and the AGV may be passed to the leaned AI model. Further, in some embodiments, the AI model may generate a velocity twist for traversing a required displacement.

In some scenarios, the AGV may have a leftward or a rightward affinity, due to a mechanical fault. In such scenarios, the velocity generated by the AI model is different from the actual produced velocity. It should be noted that, the actual produced velocity (velocity twist) of the AGV may include an additional effort to compensate for the leftward or rightward movement of the AGV. It should be further noted that the additional effort may be a velocity twist including a linear velocity component and an angular velocity component. A series of actual produced velocity may be compared with the AI generated velocity for the above scenarios over a period of time. Based on the comparison, a decision is taken on whether the AGV is facing any mechanical imbalance issue or not. Accordingly, a possible mechanical fault alert may be generated for the detected faults. Also a significant angular orientation deviation will be observed on the AGV with respect to the trajectory point orientation. The step 403 for detecting a mechanical fault in the AGV is further explained in detail in conjunction with FIGS. 7A-D.

Referring now to FIGS. 7A-7D, an exemplary process for detecting a mechanical fault in an AGV is illustrated, in accordance with an embodiment. The mechanical fault in an AGV may be detected by determining an orientation shift of the AGV over the set of trajectory plan segments. FIGS. 7A-7D show fixed displacement trajectory plans 701-704, respectively, for an AGV. Each of the fixed displacement trajectory plans 701-704 may include a set of trajectory plan segments. The trajectory plans 701-704 may be dynamically determined. Referring to FIG. 7A, an original fixed displacement trajectory plan 701 includes a set of trajectory plan segments. For example, one of the trajectory plan segments may include an initial trajectory waypoint 705 and a final trajectory waypoint 706.

In a scenario, with the AGV having a rightward or a leftward affinity, an actual path of the AGV may deviate from the original trajectory plan. For example, referring to FIG. 7B, for the AGV having a rightward affinity 707, the actual path 708 of the AGV may deviate from the original trajectory plan trajectory 701. In such scenarios, a first dynamically determined trajectory plan 702 based on a location and orientation of the AGV may be determined. FIG. 7C further shows a deviation of the actual path 708 of the AGV from the dynamically determined trajectory plan 702. The angular velocity component may push for an extra effort to align the actual path 708 of the AGV with the trajectory plan 702. For example, at a first time-instance corresponding to the initial trajectory waypoint 705, the AGV due to a rightward movement affinity, may start to perform a rightward movement and start deviating from the trajectory plan segment. At this first time-instance, a second dynamically determined trajectory plan 703 based on a location and orientation of the AGV may be determined, At a second time-instance, the rightward movement of the AGV may take it away from the final trajectory waypoint 706 to a new trajectory waypoint 709. This rightward shift of the trajectory plan between the first time-instance and the second time-instance may be identified as a mechanical fault.

Referring to FIG. 7D, an orientation shift 712 of the AGV may take place due to the deviation from the actual path of the AGV introduced by the rightward affinity 707 due to the mechanical fault, leading to a third dynamically determined trajectory plan 704. The orientation shift 712 may be calculated by comparing an orientation of the AGV at the initial trajectory waypoint 705 and the final trajectory waypoint 706. For example, the AGV may have a first orientation 710 at the initial trajectory waypoint 705 a second orientation 711 at the final trajectory waypoint 706.

Returning back to FIG. 4, at step 404, the mechanical fault may be compensated by initiating the corrective action. By way of an example, the ACM 206 may compensate for the mechanical fault by initiating the corrective action. It may be understood that in some scenarios, the AI velocity monitor may indicate an additional shifting effort by the AGV, by observing that an extra torque is being applied for compensating angular shift, and that no external reason is found (by perception module) for the additional effort because of which the vehicle may be deviating from planned trajectory. In such scenarios, measures have to be taken to avoid drastic deviation from original trajectory plan before the AGV demands a heavy turn to reach towards original trajectory plan and hence path. Further, in such scenarios, no new trajectory plan may be generated from the deviated position of AGV from the planned trajectory.

The corrective action may include suspending the dynamic determination of the trajectory plan from the current orientation of the AGV. The corrective action may further include, at the deviated position of the AGV and at each new position of the AGV, determining a direction of a next trajectory waypoint on an originally planned trajectory, calculating an angle of deviation (∅) of the AGV between a current orientation of the AGV and the direction of the next trajectory waypoint, comparing the angle of deviation of the AGV with a pre-defined threshold value, and initiating the corrective action based on the comparison and the angle of deviation (∅) of the AGV. The step 404 of compensating the mechanical fault by initiating the corrective action is further explained in detail, in conjunction with FIGS. 8A-D.

Referring now to FIGS. 8A-D, an exemplary process of compensating for the mechanical fault by initiating a corrective action is depicted, in accordance with some embodiments of the present disclosure. FIG. 8A shows'fixed displacement trajectory plans 801 for an AGV. The fixed displacement trajectory plans 801 may include a set of trajectory plan segments. For example, a trajectory plan segment may include an initial trajectory waypoint 805 and final trajectory waypoint 806.

Referring now to FIGS. 8B and 8C (FIG. 8C being a magnified view of the segment defined between the initial trajectory waypoint 805 and the final trajectory waypoint 806 of FIG. 8B), at each time-instance a first orientation 811 of the next trajectory waypoint may be determined. The first orientation may connect the current deviated position of AGV and the next waypoint of the originally planned trajectory. This may be called a 'trajectory waypoint direction'. Thereafter, a deviation of AGV current orientation from next trajectory waypoint direction may be calculated.

By way of an example, at a first time-instance, the AGV with a rightward motion affinity 810 may start moving towards the right of the trajectory plan 802 along a second orientation 812, to ultimately traverse an actual path 813. Further, at the first time-instance, a first orientation 811 towards a next trajectory waypoint may be determined. Similarly, at a second time-instance, an orientation towards a next trajectory waypoint may be determined. Further, at the second time-instance, a corrective action may be initiated from a deviated position 815 of the AGV. It should be noted that the corrective action may bring the AGV closer to the trajectory plan. At a third time-instance, the corrective action may determine a next trajectory waypoint, and the AGV may move along a corrected path 809 overcoming the path deviation due to the rightward affinity.

In some embodiments, when the deviation goes beyond a threshold value (e.g. 10 degrees) and is increasing further, twice of angular velocity of the angle of deviation 'θ' multiplied with a correction factor 'k' may be applied. By way of an example, a minimum value of the correction factor 'k' may be 0.7. Based on the difference of 'shift effort' made by the AGV and a value suggested by the AI model, the correction factor 'k' may be increased or decreased gradually. It may be noted that for a higher difference, the correction factor 'k may be increased' in steps of 0.01. Similarly, the correction factor 'k' may be decreased in same gradual steps, such that difference of 'shift effort' remains within 10 percent of actual applied effort. It may be further noted that the deviation angle 'θ' is an angle between orientation of the AGV at current instant and next way point orientation. This ensures that the AGV remains as close to the original trajectory at all times, until unless next trajectory planning became obvious.

In some embodiments, the corrective action may include suspending dynamic determination of the trajectory plan. The corrective action at the deviated position of the AGV and at each new position of the AGV may further include determining an orientation of a next trajectory waypoint on an originally planned trajectory and calculating an angle of deviation 814 of the AGV between a current orientation of the AGV and the direction of the next trajectory waypoint, comparing the angle of deviation 814 of the AGV with a pre-defined threshold value, and initiating the corrective action based on the comparison and the angle of deviation 814 of the AGV. The corrective action may cause the AGV to take a corrected path, bringing the AGV with a mechanical fault closer to the trajectory plan. In an exemplary scenario, an AGV with a rightward motion affinity moves closer to the trajectory plan between the first time-instance and an 'n' time-instance due to the corrective action.

Returning back to FIG. 4, at step 405, the VLM 207 may dynamically determine a new location of the AGV in motion. In some embodiments, the dynamic determination of the new location of the AGV in motion may be based on data received from the position sensor 108 and the orientation sensor 109 and comparing the data with the navigation map.

As will be appreciated by those skilled in the art, the techniques described in the various embodiments discussed above are not routine, or conventional, or well understood in the art. As mentioned earlier, the techniques include initiating a navigation and base path planning, feeding a trajectory velocity generation scenario in a pre-trained AI model to predict an ideal velocity, comparing the actual generated velocity twists with a learned AI model generated velocity series, identifying any significant variation over a certain period of time in angular velocity applied and learning based calculation, and compensating the angular velocity for keeping the vehicle aligned to the original trajectory. The techniques may provide for monitoring a mechanical left or right affinity of an AGV when significant wear-n-tear is reached. Further, the techniques discussed above provide for detection of problems in the motion of an AGV while ensuring that the correct path of travel is maintained by the AGV. Typically, an AGV navigates by global path planning for navigation and then a finer trajectory planning for the local visible region. It should be noted that an AGV with a mechanical fault may develop a sideward motion affinity. The AGV with a sideward motion affinity may move farther away from the trajectory plan. To stay closer to the trajectory plan, the AGV may apply an additional effort. The additional effort may make the AGV fuel inefficient. The techniques described above may identify the additional effort to detect a mechanical fault in the AGV. In particular, the techniques provide for detecting and compensating a mechanical fault in an AGV by identifying an additional effort applied by the AGV to move along the trajectory plan and determining the direction of the AGV towards the next trajectory waypoint on the original trajectory plan. Further, as will be appreciated, the techniques may be applied to AGV employed in indoor environment (e.g., shop floors, retail shops, or the like) as well as outdoor environment (e.g., autonomous vehicles).

The specification has described method and system for detecting and compensating for mechanical fault in an AGV. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of detecting a mechanical fault in an autonomous ground vehicle (AGV), the method comprising:

for each of a set of trajectory plan segments along a base path during real-time navigation of the AGV,
receiving, by a fault detection device, a plurality of vehicle displacement parameters along a given trajectory plan segment; and
determining, by the fault detection device, an optimal velocity twist of the AGV in the given trajectory plan segment using an artificial intelligence (AI) model, based on the plurality of vehicle displacement parameters and a weight of the AGV; and
determining, by the fault detection device, the mechanical fault in the AGV based on a comparison of an actual velocity twist of the AGV in the given trajectory plan segment and the optimal velocity twist of the AGV in the given trajectory plan segment for each of the set of trajectory plan segments.

2. The method of claim 1, further comprising:
determining the base path based on an initial location of the AGV and a destination location received from a user;
dynamically determining a trajectory plan for a trajectory plan segment along the base path based on a visible navigation region from a current location of the AGV, wherein the trajectory plan comprises velocity-position plan for the AGV; and
determining the plurality of vehicle displacement parameters for the trajectory plan segment based on the trajectory plan for the trajectory plan segment.

3. The method of claim 1, wherein the plurality of vehicle displacement parameters comprise an approaching velocity twist of the AGV for the given trajectory plan segment, a departing velocity twist of the AGV for the given trajectory plan segment, an approaching orientation of the AGV in the given trajectory plan segment and an orientation shift in the given trajectory plan segment.

4. The method of claim 1, wherein a velocity twist of the AGV comprises an angular velocity of the AGV and a linear velocity of the AGV.

5. The method of claim 1, wherein the AI model comprises an artificial neural network (ANN) based model.

6. The method of claim 1, further comprising training the AI model using training data to learn a function for determining the optimal velocity twist of the AGV in each of a plurality of trajectory plan segments based on the weight of the AGV, wherein the training data is generated by manually driving the AGV along a predefined path at a predefined speed.

7. The method of claim 1, wherein determining the mechanical au in the AGV further comprises at least one of:
determining an angular shift of the AGV over the set of trajectory plan segments; and
determining a need for an additional effort required by the AGV to compensate for the angular shift.

8. The method of claim 1, further comprising at least one of:
notifying a user with respect to the mechanical fault; and
compensating for the mechanical fault by initiating a corrective action.

9. The method of claim 8, wherein initiating the corrective action comprises:
from a deviated position of the AGV, suspending dynamic determination of a trajectory plan;
at the deviated position of the AGV and at each new position of the AGV,
determining a direction of a next trajectory waypoint on an originally planned trajectory;
calculating an angle of deviation of the AGV between a current orientation of the AGV and the direction of the next trajectory waypoint;
comparing the angle of deviation of the AGV with a pre-defined threshold value; and
initiating the correction action based on the comparison and the angle of deviation of the AGV.

10. A system for detecting a mechanical fault in an autonomous ground vehicle (AGV), the system comprising:
a fault detection device comprising at least one processor and a computer-readable medium storing instructions that, when executed by the at least one processor, cause the at least one processor to perform operations comprising:
for each of a set of trajectory plan segments along a base path during real-time navigation of the AGV,
receiving a plurality of vehicle displacement parameters along a given trajectory plan segment; and
determining an optimal velocity twist of the AGV in the given trajectory plan segment using an artificial intelligence (AI) model, based on the plurality of vehicle displacement parameters and a weight of the AGV; and
determining the mechanical fault in the AGV based on a comparison of an actual velocity twist of the AGV in the given trajectory plan segment and the optimal velocity twist of the AGV in the given trajectory plan segment for each of the set of trajectory plan segments.

11. The system of claim 10, wherein the operations further comprise:
determining the base path based on an initial location of the AGV and a destination location received from a user;
dynamically determining a trajectory plan for a trajectory plan segment along the base path based on a visible navigation region from a current location of the AGV, wherein the trajectory plan comprises velocity-position plan for the AGV; and
determining a plurality of vehicle displacement parameters for the trajectory plan segment based on the trajectory plan for the trajectory plan segment.

12. The system of claim 10, wherein the operations further comprise training the AI model using training data to learn a function for determining the optimal velocity twist of the AGV in each of a plurality of trajectory plan segments based on the weight of the AGV, wherein the training data is generated by manually driving the AGV along a predefined path at a predefined speed.

13. The system of claim 10, wherein determining the mechanical fault in the AGV further comprises at least one of:
determining an angular shift of the AGV over the set of trajectory plan segments; and
determining a need for an additional effort required by the AGV to compensate for the angular shift.

14. The system of claim 10, wherein the operations further comprise at least one of:
notifying a user with respect to the mechanical fault; and
compensating for the mechanical fault by initiating a corrective action.

15. The system of claim 14, wherein initiating the corrective action comprises:
from a deviated position of the AGV, suspending dynamic determination of a trajectory plan;
at the deviated position of the AGV and at each new position of the AGV, determining a direction of a next trajectory waypoint on an originally planned trajectory;

calculating an angle of deviation of the AGV between a current orientation of the AGV and the direction of the next trajectory waypoint;

comparing the angle of deviation of the AGV with a pre-defined threshold value; and initiating the correction action based on the comparison and the angle of deviation of the AGV.

16. A non-transitory computer-readable medium storing computer-executable instructions for detecting a mechanical fault in an autonomous ground vehicle (AGV), the computer-executable instructions configured for:

for each of a set of trajectory plan segments along a base path during real-time navigation of the AGV, receiving a plurality of vehicle displacement parameters along a given trajectory plan segment; and determining an optimal velocity twist of the AGV in the given trajectory plan segment using an artificial intelligence (AI) model, based on the plurality of vehicle displacement parameters and a weight of the AGV; and determining the mechanical fault in the AGV based on a comparison of an actual velocity twist of the AGV in the given trajectory plan segment and the optimal velocity twist of the AGV in the given trajectory plan segment for each of the set of trajectory plan segments.

17. The non-transitory computer-readable medium of claim 16, wherein the computer-executable instructions are further configured for:

determining the base path based on an initial location of the AGV and a destination location received from a user;

dynamically determining a trajectory plan for a trajectory plan segment along the base path based on a visible navigation region from a current location of the AGV, wherein the trajectory plan comprises velocity-position plan for the AGV; and determining a plurality of vehicle displacement parameters for the trajectory plan segment based on the trajectory plan for the trajectory plan segment.

18. The non-transitory computer-readable medium of claim 16, wherein determining the mechanical fault in the AGV further comprises at least one of:

determining an angular shift of the AGV over the set of trajectory plan segments; and determining a need for an additional effort required by the AGV to compensate for the angular shift.

19. The non-transitory computer-readable medium of claim 16, wherein the computer-executable instructions are further configured for:

notifying a user with respect to the mechanical fault; and compensating for the mechanical fault by initiating a corrective action.

20. The non-transitory computer-readable medium of claim 19, wherein initiating the corrective action comprises:

from a deviated position of the AGV, suspending dynamic determination of a trajectory plan;

at the deviated position of the AGV and at each new position of the AGV, determining a direction of a next trajectory waypoint on an originally planned trajectory;

calculating an angle of deviation of the AGV between a current orientation of the AGV and the direction of the next trajectory waypoint;

comparing the angle of deviation of the AGV with a pre-defined threshold value; and initiating the correction action based on the comparison and the angle of deviation of the AGV.

* * * * *